(12) United States Patent
Generale et al.

(10) Patent No.: US 11,415,002 B2
(45) Date of Patent: Aug. 16, 2022

(54) BAFFLE WITH IMPINGEMENT HOLES

(71) Applicant: UNITED TECHNOLOGIES CORPORATION, Farmington, CT (US)

(72) Inventors: Adam P. Generale, Dobbs Ferry, NY (US); Lucas Dvorozniak, Bloomfield, CT (US); San Quach, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/657,135

(22) Filed: Oct. 18, 2019

(65) Prior Publication Data

US 2021/0115801 A1    Apr. 22, 2021

(51) Int. Cl.
*F01D 5/18* (2006.01)
*F01D 25/12* (2006.01)

(52) U.S. Cl.
CPC ............. *F01D 5/189* (2013.01); *F01D 25/12* (2013.01); *F05D 2260/201* (2013.01)

(58) Field of Classification Search
CPC .......... F01D 5/189; F01D 25/12; F01D 5/284; F05D 2260/201
See application file for complete search history.

(56) References Cited

U.S. PATENT DOCUMENTS 6,402,458 B1 * 6/2002 Turner ............... F01D 5/142
                                                   415/1
10,633,982 B2 * 4/2020 Bang ................ F01D 9/065
(Continued)

FOREIGN PATENT DOCUMENTS

| EP | 2949866 | 12/2015 |
|---|---|---|
| EP | 3460194 | 3/2019 |
| WO | 2019003590 A1 | 1/2019 |

OTHER PUBLICATIONS

The Extended European Search Report for European Patent Application No. 20200876.9, dated Mar. 19, 2021.

Primary Examiner — Justin D Seabe
Assistant Examiner — Eric A Lange
(74) Attorney, Agent, or Firm — Carlson, Gaskey & Olds, P.C.

(57) ABSTRACT

An airfoil includes an vane airfoil, which has a ceramic matrix composite airfoil section including an outer wall that defines an internal cavity. The vane airfoil has an associated temperature profile which defines at least one high temperature area and at least one low temperature area. The vane airfoil includes a first zone which is defined in a first radial extent and corresponds to the high temperature area of the temperature profile and a second zone defined in a second radial extent and corresponds to the low temperature area of the temperature profile. An insert is situated in the internal cavity. The insert includes a first zone defined in a first radial extent that is aligned with the first zone of the vane airfoil. The first zone includes a first plurality of cooling holes which are configured to provide a first cooling density. A second zone is defined in a second radial extent that is aligned with the second zone of the vane airfoil. The second zone includes a second plurality of cooling holes that provide a second cooling density that is lower than the first cooling density such that the high temperature area and the low temperature area are balanced to lower a thermal gradient across the first and second zones of the vane airfoil. An vane airfoil and a method of assembling a ceramic matrix composite vane airfoil are also disclosed.

24 Claims, 5 Drawing Sheets

(56) References Cited

U.S. PATENT DOCUMENTS

| | | | |
|---|---|---|---|
| 2017/0067363 A1* | 3/2017 | Lacy | B22F 5/04 |
| 2017/0081966 A1* | 3/2017 | Huizenga | F01D 25/12 |
| 2017/0130589 A1* | 5/2017 | Cui | F01D 5/18 |
| 2018/0045055 A1 | 2/2018 | Brzek et al. | |
| 2019/0153875 A1 | 5/2019 | Kreitzer et al. | |
| 2020/0190989 A1* | 6/2020 | Fujii | F01D 5/188 |

* cited by examiner

BAFFLE WITH IMPINGEMENT HOLES

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Any of the fan section, the turbine section, and the compressor section include airfoils, such as for fan, compressor, or turbine blades. Baffles are known and used in cooled gas turbine engine airfoils, such as turbine vanes. Typically, a baffle is situated in a cavity in the airfoil and serves to distribute cooling air to precise locations in the airfoil.

SUMMARY

An airfoil component according to an exemplary embodiment of this disclosure, among other possible things includes an vane airfoil, which has a ceramic matrix composite airfoil section including an outer wall that defines an internal cavity. The vane airfoil has an associated temperature profile which defines at least one high temperature area and at least one low temperature area. The vane airfoil includes a first zone which is defined in a first radial extent and corresponds to the high temperature area of the temperature profile and a second zone defined in a second radial extent and corresponds to the low temperature area of the temperature profile. An insert is situated in the internal cavity. The insert includes a first zone defined in a first radial extent that is aligned with the first zone of the vane airfoil. The first zone includes a first plurality of cooling holes which are configured to provide a first cooling density. A second zone is defined in a second radial extent that is aligned with the second zone of the vane airfoil. The second zone includes a second plurality of cooling holes that provide a second cooling density that is lower than the first cooling density such that the high temperature area and the low temperature area are balanced to lower a thermal gradient across the first and second zones of the vane airfoil.

In a further example of the foregoing, the high temperature area and low temperature area correspond to an airfoil section of the vane airfoil.

In a further example of any of the foregoing, the first plurality of cooling holes have a first hole distribution density thereby providing the first cooling density. The second plurality of cooling holes have a second hole distribution density which provide the second cooling density. The first hole distribution density is different from the second hole distribution density.

In a further example of any of the foregoing, the first plurality of cooling holes have a first cumulative cross-sectional area which provides the first cooling density. The second plurality of cooling holes have a second cumulative cross-sectional area which provides the second cooling density. The first cumulative cross-sectional area is different from the second cumulative cross-sectional area.

In a further example of any of the foregoing, one of the first and second cooling densities is zero, and the other of the first and second cooling densities is nonzero.

In a further example of any of the foregoing, at least one rib extends in a radial direction on the insert.

In a further example of any of the foregoing, the airfoil component includes a transition zone between the first and second zones of the insert. The transition zone includes a gradual change in cooling density from the first cooling density to the second cooling density in a radial direction.

In a further example of any of the foregoing, the vane airfoil includes a third zone. The third zone is defined in a third radial extent of the vane airfoil. The insert includes a third zone which is defined in a third radial extent that is aligned with the third zone of the vane airfoil. The third zone of the insert includes a third plurality of cooling holes that provide a third cooling density. The third cooling density being different from at least one of the first and second cooling densities.

An vane airfoil according to an exemplary embodiment of this disclosure, among other possible things includes an airfoil section which includes an outer wall that defines an internal cavity. An insert is situated in the internal cavity. The insert includes a first zone which is defined in a radial extent of the insert. The first zone includes a first plurality of cooling holes, and a second zone is defined in a radial extent of the insert. The second zone includes a second plurality of cooling holes. The first plurality of cooling holes provide a first cooling density and the second plurality of cooling holes provide a second cooling density. The first cooling density is different from the second cooling density and the first plurality of cooling holes and the second plurality of cooling holes are configured to jet air towards the airfoil outer wall.

In a further example of the foregoing, the vane airfoil includes a transition zone between the first and second zones. The transition zone includes a gradual change in cooling density from the first density to the second density in a radial direction.

In a further example of any of the foregoing, the vane airfoil includes a third zone which is defined in a radial extent of the insert. The third zone includes a plurality of cooling holes. The plurality of cooling holes in the third zone have a third density. The third density being different from at least one of the first and second densities.

In a further example of any of the foregoing, the insert is a spar, and the spar is configured to provide structural support to the airfoil section.

In a further example of any of the foregoing, the airfoil section is a ceramic matrix composite.

A method of assembling a ceramic matrix composite vane airfoil according to an exemplary embodiment of this disclosure, among other possible things includes providing an insert. The insert includes a first zone defined in a first radial extent with respect to an airfoil component and corresponds to a first expected temperature of the airfoil component. A second zone is defined in a second radial extent with respect to the airfoil component and corresponds to a second expected temperature of the airfoil component. The first zone has a first plurality of cooling holes that provide a first cooling density which corresponds to the first expected temperature and the second zone has a second plurality of cooling holes that provide a second cooling density which corresponds to the second expected temperature. The first and second expected temperatures are different from one another. An insert is inserted into the airfoil component.

In a further example of the foregoing, at least some of the first and second pluralities of cooling holes are configured to jet air towards the airfoil component in a direction normal to a wall of the airfoil component.

In a further example of any of the foregoing, the first plurality of cooling holes are spaced apart from one another by a first distance, which provides the first cooling density. The second plurality of cooling holes are spaced apart from one another by a second distance, which provides the second cooling density. The first distance is different from the second distance.

In a further example of any of the foregoing, the first plurality of cooling holes have a first cumulative cross-sectional area, which provide the first cooling. The second plurality of cooling holes have a second cumulative cross-sectional area which provide the second cooling density. The first cumulative cross-sectional area is different from the second cumulative cross-sectional area.

In a further example of any of the foregoing, the insert is a spar, and the spar is configured to provide structural support to the airfoil section.

In a further example of any of the foregoing, a third zone defined in a third radial extent with respect to the airfoil component, and corresponds to a third expected temperature of the airfoil component. The third zone includes a third plurality of cooling holes that provide a third cooling density. The third cooling density being different from at least one of the first and second cooling densities.

In a further example of any of the foregoing, the insert includes at least one rib which extends in a radial direction on the insert.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The various features and advantages of the present disclosure will become apparent to those skilled in the art from the following detailed description. The drawings that accompany the detailed description can be briefly described as follows.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
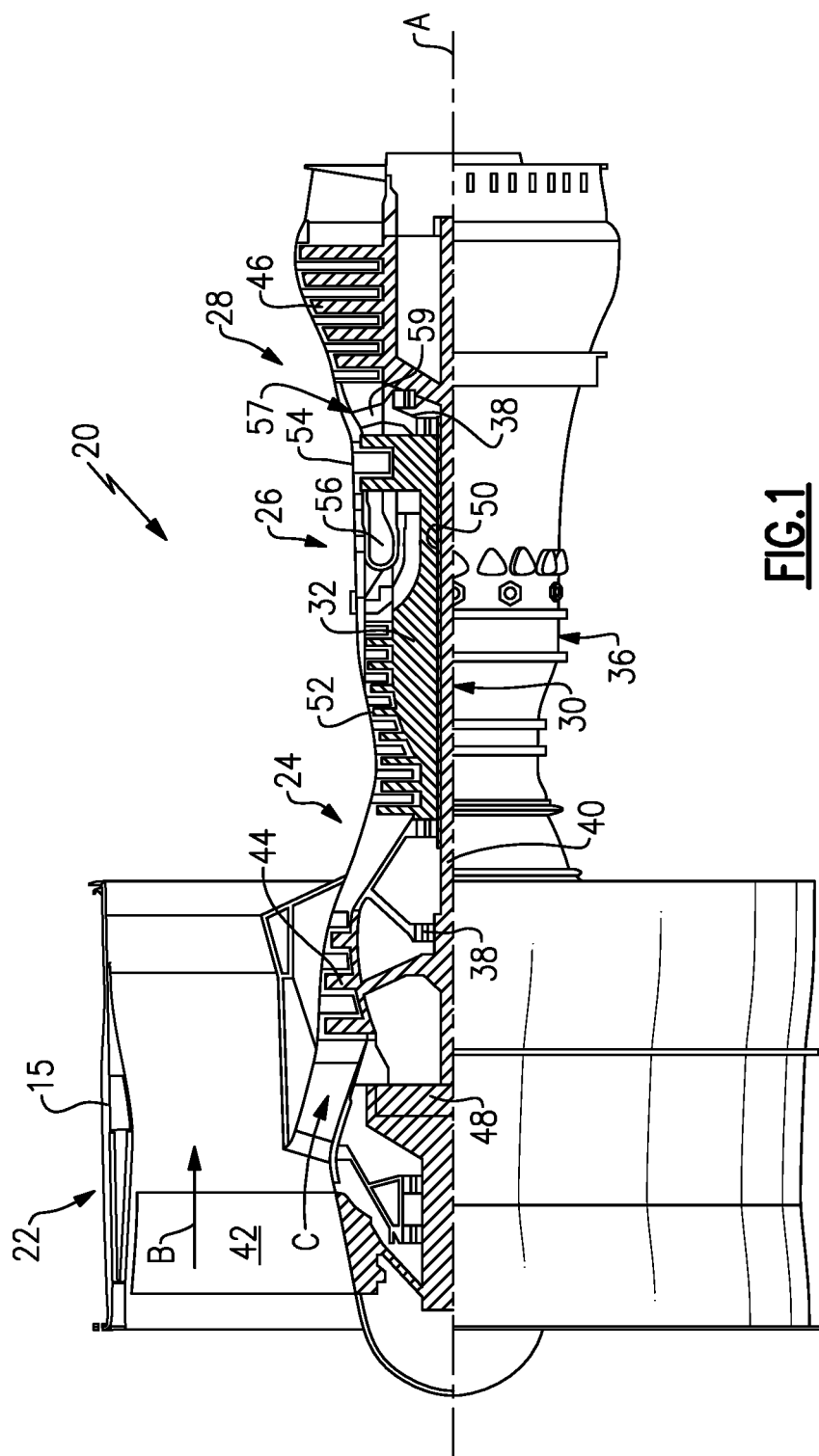
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7°R)]^0.5. The "Low corrected fan tip speed" as disclosed herein according to one non-limiting embodiment is less than about 1150 ft/second (350.5 meters/second).

Figure 2:
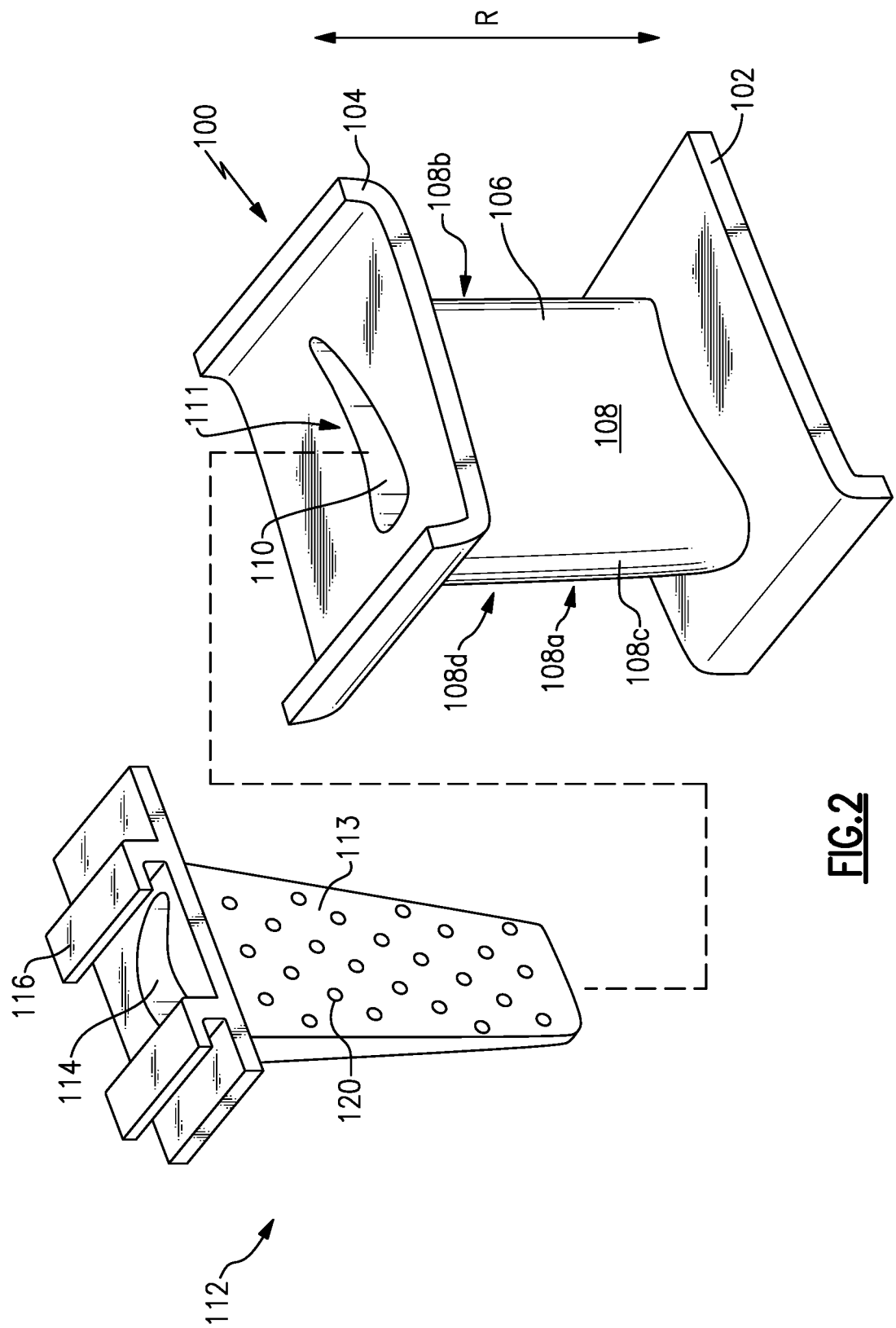
FIG. 2 schematically shows an example airfoil for the gas turbine engine of FIG. 1.

FIG. 2 schematically shows an vane airfoil 100 from the turbine section 28 of the engine 20. A plurality of vane airfoils 100 are situated in a circumferential row about the engine central axis A. The vane airfoil 100 includes a first or inner platform 102, a second or outer platform 104, and an airfoil section 106 that spans between the inner and outer platforms 102/104. The airfoil section 106 includes an airfoil outer wall 108 that delimits the profile of the airfoil section 106. The outer wall 108 defines a leading end 108a, a trailing end 108b, and first and second sides 108c/108d that join the leading and trailing ends 108a/108b. In this example, the first side 108c is a suction side and the second side 108d is a pressure side. The outer wall 108 circumscribes an internal cavity 110. The cavity 110 may be a single cavity or a sub-cavity, for example.

The vane airfoil 100 is formed of a ceramic material, such as a ceramic matrix composite (CMC) material. For example, the CMC includes a ceramic matrix and ceramic fibers disposed in the ceramic matrix. The ceramic matrix may be, but is not limited to, silicon carbide (SiC) and the ceramic fibers may be, but are not limited to, silicon carbide (SiC) fibers. The CMC is comprised of fiber plies that are arranged in a stacked configuration and formed to the desired geometry of the vane airfoil 100. For instance, the fiber plies may be layers or tapes that are laid-up one on top of the other to form the stacked configuration. The fiber plies may be woven or unidirectional, for example. At least a portion of the fiber plies are continuous through the platforms 102/104 and the airfoil section 106. In this regard, the vane airfoil 100 is a continuous body in that the fiber plies are uninterrupted through the platforms 102/104 and the airfoil section 106.

The vane airfoil 100 also includes an insert 112 that is disposed in the internal cavity 110. For instance, the insert 112 can be a spar, which provides structural support for the vane airfoil 100. In another example, the insert 112 is a baffle. In yet another example, the insert 112 is configured to act as both a spar and a baffle.

The insert 112 includes an insert wall 113 that defines and surrounds a central cavity. In one example, the insert wall 113 generally tracks the shape of the airfoil outer wall 108. The insert wall 113 includes a plurality of cooling holes 120. During operation of the engine 20, the outer face of the airfoil outer wall 108 is exposed to hot combustion gases. Cooling air such as bleed air from the compressor section 24 (FIG. 1), is provided into the internal cavity 110 of the vane airfoil 100 and to the central cavity 114 of the insert 112. The cooling holes 120 jet the cooling air towards the sides 108c/108d of the airfoil section 106. This jetting provides impingement cooling to the airfoil section 106.

To assemble the vane airfoil 100, the insert 112 is inserted into the airfoil section 106 from an opening 111 shown in FIG. 2. In the example of FIG. 2, the opening 111 is in the outer platform 104, but in another example, the opening can be in the inner platform 102. The insert 112 is then secured to the vane airfoil 100 or another surrounding structure in the engine 20, such as by attachment features 116. Once seated, the insert 112 is then secured in place, such as to the vane airfoil 100 or another adjacent structure in the engine 20. Such an installation of the insert 112 into the airfoil section 106 may be conducted as an initial assembly of the vane airfoil 100 or, alternatively, as part of a repair or replacement process. For example, the baffle 112 can be bolted, clamped, or otherwise joined to either of the airfoil section 106, the adjacent structures in the engine 20, or both.

The insert 112 may be provided as a pre-fabricated component for the insertion into the airfoil section 106. Alternatively, the insert 112 may be fabricated through a forming process as part of the assembly process of the vane airfoil 100. Furthermore, the insert 112 can be installed as above as part of an original fabrication of the vane airfoil 100, or as a repair or reconstruction of a vane airfoil 100 after a period of use in the engine 20.

As discussed above, during operation of the engine 20, the airfoil section 106 is exposed to hot combustion gases in the engine 20 and experiences a thermal gradient in the radial direction R (FIG. 2). That is, certain areas of the airfoil section 106 experience higher temperatures than others.

In general, vanes formed of superalloys employ a thermal management strategy that involves cooling the vane as much as possible, to avoid exceeding the temperature limit of the superalloy and to limit effects of creep and fatigue. This paradigm dictates use of cooling schemes designed to maximize cooling effects. Ceramic materials, such as the CMC material discussed above, however, have high maximum use temperatures in comparison to metallic superalloys. Therefore, vanes formed of ceramic materials have no need to employ the same thermal management strategy that is used for superalloy vanes.

Additionally, ceramic materials have significantly lower thermal conductivity than superalloys and do not possess the same strength and ductility characteristics, making them more susceptible to distress from thermal gradients and the thermally induced stresses those cause. Therefore, although maximum cooling may be desirable for superalloy vanes, maximized cooling of a ceramic vane may exacerbate thermal gradients and thus be counter-productive to meeting durability goals. The cooling scheme represented in the examples described herein takes the approach of reducing thermal gradients, e.g., balances the temperature of various areas of the airfoil to a lower thermal gradient across the airfoil, to facilitate mitigation of thermal stresses on the ceramic.

Figure 3A:
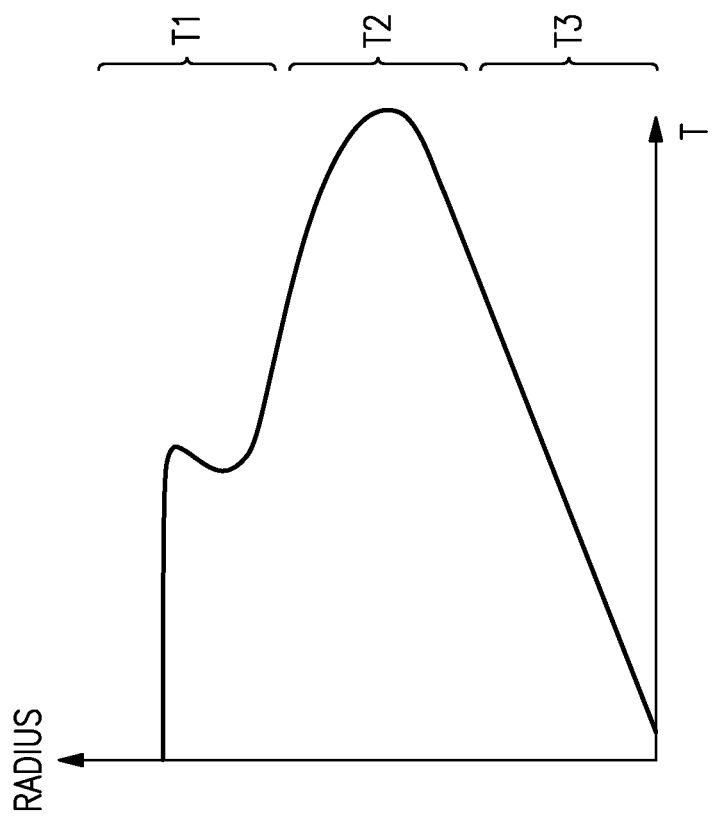
FIG. 3A-C show example temperature profiles for an example airfoil for the gas turbine engine of FIG. 1.
Figure 3B:
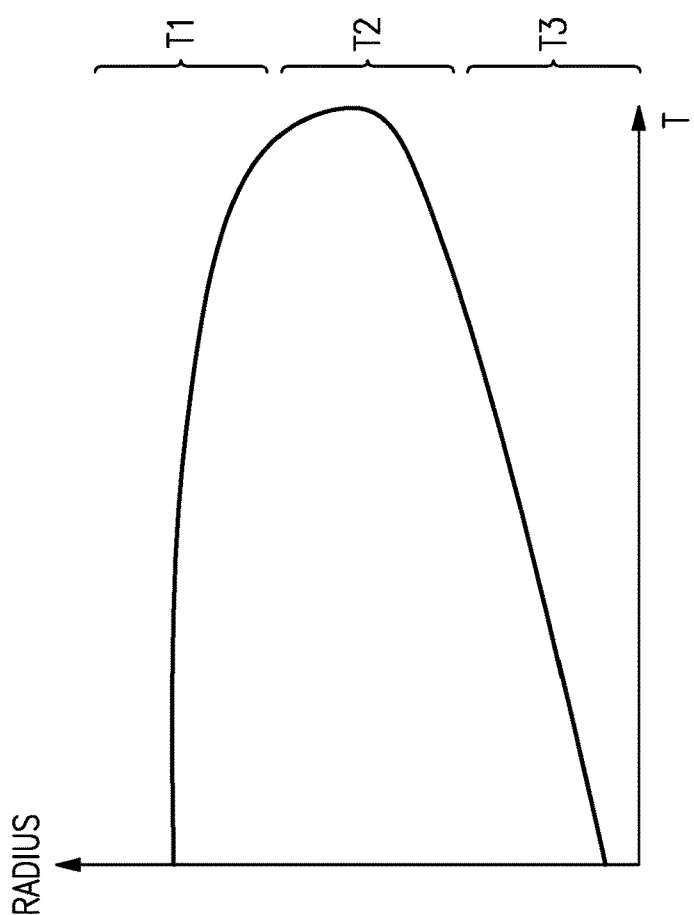
Figure 3C:
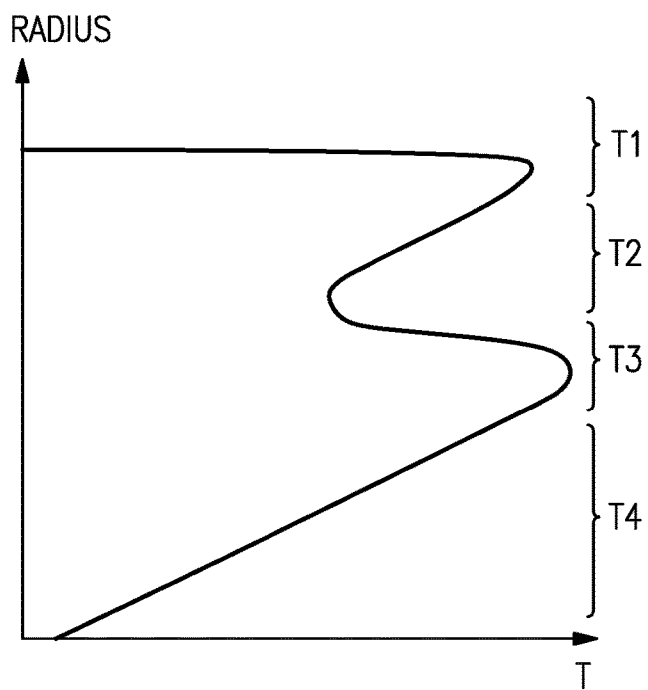

FIGS. 3A-C show example thermal profiles for airfoil section 106 in the form of temperature (T) plotted against radius (R), i.e., a temperature profile. In FIGS. 3A-C, the airfoil section 106 defines a radial span R of 0% at the innermost end of the airfoil section 106 and a radial span R of 100% at the radially outermost end of the airfoil section 106. As shown the thermal profiles can include localized "hot spot" peaks of high temperatures and areas of relatively lower temperature valleys.

The insert 112 includes cooling holes 120 that facilitate impingement cooling of the airfoil outer wall 108 by jetting cooling air towards the airfoil outer wall 108. Because of the thermal profiles discussed above, some areas of the airfoil outer wall 108 benefit from more cooling than other areas. Accordingly, the cooling holes are distributed throughout the insert to address the thermal profiles in order to balance the temperatures of various areas of the airfoil outer wall 108 to a lower thermal gradient across the airfoil outer wall 108. In other words, the distribution of cooling holes 120 corresponds to the thermal gradient such that more cooling is provided in areas of the airfoil section 106 that are expected to experience higher temperatures and less cooling is provided in areas of the airfoil section 106 that are expected to experience lower temperatures. To that end, a higher density of cooling holes 120 are provided in areas that require more cooling to balance the temperatures of various areas of the the airfoil outer wall 108 to a lower thermal gradient across the airfoil outer wall.

The amount of cooling, or "cooling density," is related to a cumulative cross-sectional area of the cooling holes 120 in an incremental radial region of the airfoil section 106. The cumulative cross-sectional area is in turn related to the cooling hole 120 distribution density (number of cooling holes 120 in an area of the airfoil section 106, which is in turn related to the spacing between adjacent holes 120), the cumulative size of the cooling holes 120, or both. In other words, cooling density can be increased by increasing the cumulative size of the cooling holes 120, increasing the hole 120 distribution density (e.g., providing more cooling holes in an area by decreasing a distance d between cooling holes), or both. Conversely, cooling density can be decreased by decreasing the cumulative size of the cooling holes 120, decreasing the hole 120 distribution density, or both.

The cooling holes 120 can be circular in shape, or can have other shapes such as ovals or the like. The cooling holes 120 can all be the same size (e.g., have the same cross-sectional area) or have varying sizes. The cooling holes 120 can be punched into the material of the insert 112, which can be thin metal such as sheet metal. In general, the cooling holes 120 are configured to jet cooling air towards the airfoil outer wall 108 such that the cooling air impinges the airfoil outer wall 108 at an angle approximately normal to the airfoil outer wall 108. However, in some examples, the cooling holes 120 may jet the cooling air at a different angle with respect to the airfoil outer wall 108.

Figure 4A:
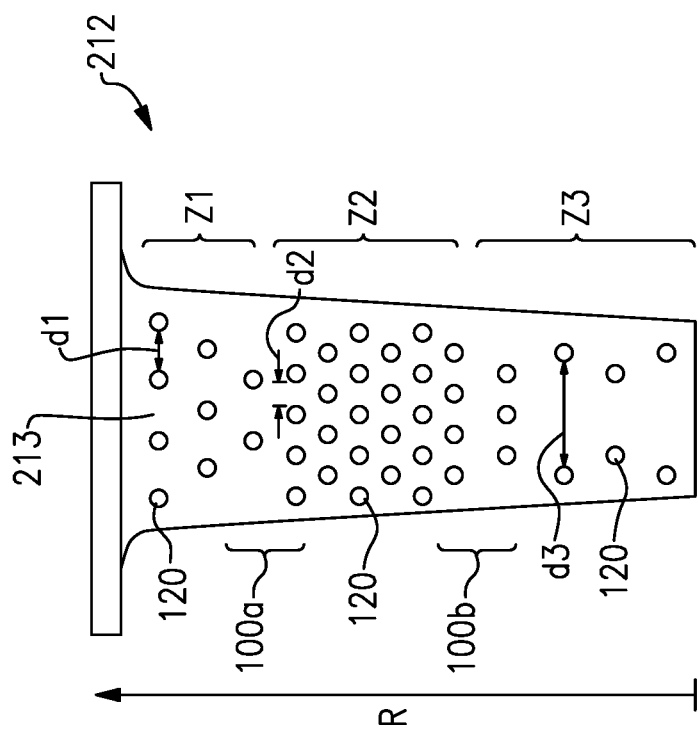
FIGS. 4A-D show example inserts for the example airfoil for the gas turbine engine of FIG. 1 that correspond to the thermal gradients of FIGS. 3A-C.
Figure 4B:
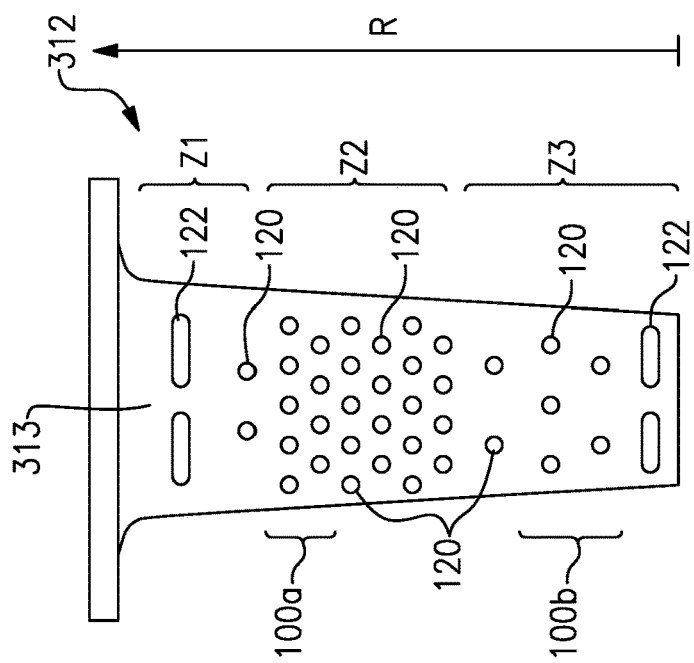
Figure 4C:
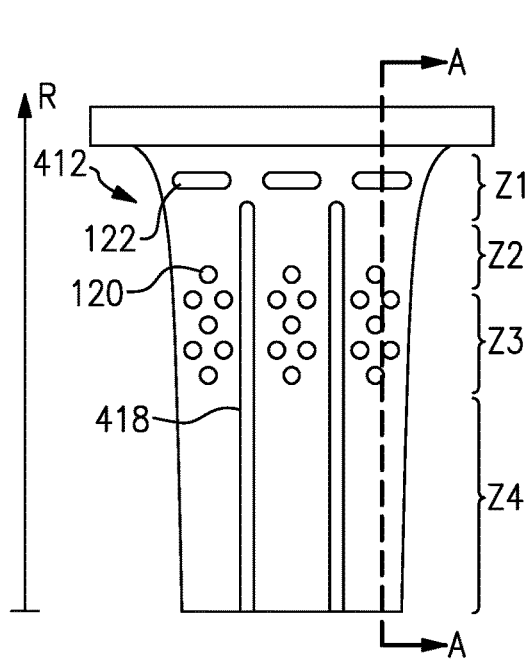

FIGS. 4A-C show example inserts that correspond to the thermal gradients of FIGS. 3A-C, respectively. That is, the insert of FIG. 4A has a cooling hole 120 distribution selected for a vane airfoil 100 that experiences the thermal profile shown in FIG. 3A such that the thermal gradient across the vane airfoil 100 is reduced, and so on. It should be understood that the example thermal gradients of FIGS. 3A-C are only exemplary, and that other thermal gradients are contemplated. Accordingly, the corresponding example inserts 4A-C are also only exemplary, and other inserts are contemplated so long as they correspond to a thermal gradient as discussed herein.

As shown in FIG. 3A, the temperature profile includes three main temperature zones T1, T2, and T3. Each temperature zone T1, T2, T3 includes a peak or valley temperature and the shoulders around the peaks/valleys. For example, the temperature zones may include a peak/trough temperature and a shoulder that represents plus/minus 400 degrees F. from the peak/valley. In a more particular example, the temperature zones may include a peak/trough temperature plus/minus 200 degrees F. Accordingly, the insert 212 of FIG. 4A includes three main zones Z1, Z2, Z3 that correspond to the temperature zones T1, T2, T3, respectively. Each zone Z1, Z2, Z3 is defined along a radial extent of the insert 212 wall 213.

Because each of the zones Z1, Z2, Z3 experience temperatures in a different temperature range, each of the zones Z1, Z2, Z3 requires a different cooling density. Accordingly, each of the zones Z1, Z2, Z3 have a different distributions of cooling holes 120.

The zone Z3 experiences relatively low temperatures, and has a relatively low cooling density. As discussed above, a relatively low cooling density can correspond to a relatively smaller hole 120 distribution density (e.g., relatively larger distance d3 between adjacent cooling holes 120). However, it should be understood that a relatively low cooling density can also correspond to a relatively smaller cumulative cross-sectional area of cooling holes 120 in zone Z3.

The zone Z2 experiences relatively high temperatures, and has a high cooling density. As discussed above, a relatively high cooling density can correspond to a relatively larger hole 120 distribution density (e.g., smaller distance d2 between adjacent cooling holes 120). In one example, the hole 120 distribution density in zone Z3 differs from the hole 120 distribution density in zone Z2 by at least 50%. In another example, the hole 120 distribution density in zone Z3 differs from the hole 120 distribution density in zone Z2 by at least 20%. In an third example, the hole 120 distribution density in zone Z3 differs from the hole 120 distribution density in zone Z2 by at least 10%.

However, it should be understood that a relatively high cooling density can also correspond to a relatively larger cumulative cross-sectional area of the cooling holes 120 in zone Z2. In one example, the cumulative cross-sectional area of the cooling holes 120 in zone Z3 differs from the cumulative cross-sectional area of the cooling holes 120 in zone Z2 by at least 50%. In another example, the cumulative cross-sectional area of the cooling holes 120 in zone Z3 differs from the cumulative cross-sectional area of the cooling holes 120 in zone Z2 by at least 20%. In another example, the cumulative cross-sectional area of the cooling holes 120 in zone Z3 differs from the cumulative cross-sectional area of the cooling holes 120 in zone Z2 by at least 10%.

The zone Z1 experiences mid-range temperatures, and has cooling density in between that of the zones Z2 and Z3, corresponding to either or both of a distance d2 between adjacent cooling holes between the distances d1 and d3, or a cumulative cross-sectional area of cooling holes 120 in between the cumulative cross-sectional area of cooling holes 120 in zones Z2 and Z3, in another example. The differing cooling densities in the zones Z1, Z2, Z3 of the insert 212 address hot spots due to the temperature profile along the airfoil section 106 in the radial direction (FIG. 3A), resulting in a lowering of the temperature gradient across the airfoil section 106.

In one example, there is a transition area between zones which provides a gradual change in cooling density between adjacent zones T1, T2, T3. As shown in FIGS. 3A-C, the thermal gradients may include gradual changes between adjacent zones. Accordingly, transition areas correspond to these gradual changes in temperature so that the cooling density in the zones Z1, Z2, Z3 corresponds to the thermal gradient as it changes between zones T1, T2, T3.

In the example of FIG. 3B, a first transition zone 100a is between zones Z1 and Z2, and a second transition zone 100b is between zones Z2 and Z3. The transition zones 100a/100b have a graded cooling density. That is, the transition zones 100a/100b provide a gradual change in cooling density between the adjacent zones Z1, Z2, Z3. More particularly, in the example of FIG. 4A, the transition zone 100a has a gradual decrease in cooling density from the cooling density in Z2 to the cooling density in Z1 as radial span increases. Transition zone 100b has a gradual increase in cooling density from the cooling density in Z3 to the cooling density in Z2 as radial span increases. The transition zones 100a/100b smooth the temperature peaks along the airfoil section 106 in the radial direction to avoid very large temperature changes between adjacent regions of the airfoil section 106, which facilitates the maintenance of a relatively constant temperature across the airfoil section 106 in the radial direction.

FIG. 4B shows another example insert 312 that corresponds to the temperature profile of FIG. 3B. As above, the insert 312 includes a plurality of zones Z1, Z2, Z3 each with cooling holes 120. Each zone corresponds to a zone T1, T2, T3 of the temperature distribution in FIG. 3B. In this example, the zones Z1 and Z3 experience relatively low temperatures, and have a relatively low cooling density. The zone Z2 experiences relatively high temperatures, and has a relatively high cooling density. Transition zones 100a/100b are between the zones like in the example insert of FIG. 4A discussed above.

In this example, the zones Z1 and Z3 include cooling holes 120 of varying sizes and shapes. For instance, zones Z1 and Z3 include relatively larger oval-shaped cooling holes 122 as well as relatively smaller circular cooling holes 120. However, it should be understood that other distributions/combinations of various cooling holes can be used. Regardless, the same principles regarding cooling hole density discussed above apply.

Figure 4D:
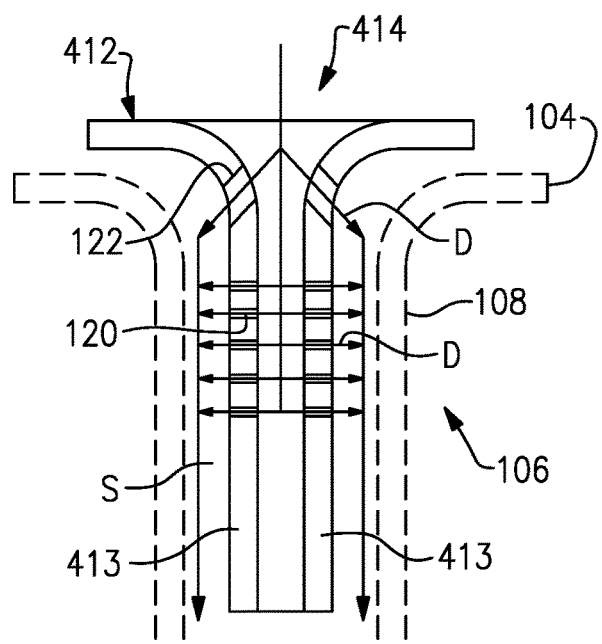

FIG. 4C shows another example insert 412 that corresponds to the temperature profile of FIG. 3C. FIG. 4D shows an example insert 412. FIG. 4D shows a cross-section of the insert 412 along the section line A-A shown in FIG. 4C. The insert 412 includes an insert wall 413 that defines a central cavity 414. As for the prior inserts of FIGS. 4A-B discussed above, the insert 412 includes a plurality of zones Z1, Z2, Z3, Z4, each with a different cooling density that corresponds to a zone T1, T2, T3, T4 of the temperature distribution in FIG. 3C. In this example the zones Z2 and Z4 experience relatively low temperatures, and have a cooling density of zero (e.g., no cooling holes). The zones Z1 and Z3 experience relatively high temperatures and have a non-zero cooling density. In this example, the zone Z1 includes relatively large oval-shaped cooling holes 122 and the zone Z3 includes relatively small circular cooling holes 120, though other sizes/shapes of cooling holes could be used in either zone Z1, Z3 to provide cooling density as discussed above.

In the example of FIGS. 4C-D, the insert 412 also includes rails or ribs 418 extending in a radial direction. In the example shown, the insert 412 includes two ribs 418, though more or less ribs could be used. Furthermore, the rib 418 can run along the entire radial extend of the insert 412 or only a portion of the radial extent of the insert 412, as shown in the example of FIGS. 4C-D. As shown in FIG. 4D, cooling air D is jetted through the cooling holes 120, 122 towards the airfoil outer wall 108 (shown in phantom in FIG. 4D) and into a space S between the airfoil outer wall 108 and the insert 412. The ribs 418 direct cooling air flowing between the insert 412 and the airfoil outer wall 108 to flow in a radial direction towards a radially inner end of the airfoil section 106. The resulting cross-flow of cooling air D in the radial direction enhances cooling of the airfoil outer wall 108 in conjunction with the impingement cooling provided by the cooling holes 120, 122.

Though the ribs 418 are shown in the example of FIGS. 4C-D, it should be understood that any of the examples described herein could include the ribs 418.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil component comprising:
   an vane airfoil having a ceramic matrix composite airfoil section including an outer wall that defines an internal cavity, the vane airfoil having an axial extent defined between a leading end and a trailing end, the vane airfoil having an associated temperature profile defining at least one high temperature area and at least one low temperature area, the vane airfoil including a first zone extending across the axial extent from the leading end to the trailing end and defined in a first radial extent and corresponding to the high temperature area of the temperature profile and a second zone extending across the axial extent from the leading end to the trailing end and defined in a second radial extent and corresponding to the low temperature area of the temperature profile wherein the first zone is radially inward from the second zone along the radial extent; and
   an insert situated in the internal cavity, the insert including a first zone defined in a first radial extent that is aligned with the first zone of the vane airfoil, the first zone including a first plurality of cooling holes configured to provide a first cooling density across an axial extent of the insert, and a second zone defined in a second radial extent that is aligned with the second zone of the vane airfoil, the second zone including a second plurality of cooling holes that provide a second cooling density across the axial extent of the insert that is lower than the first cooling density such that the high temperature area and the low temperature area are balanced to lower a thermal gradient across the first and second zones of the vane airfoil.

2. The airfoil component of claim 1, wherein the high temperature area and low temperature area correspond to an airfoil section of the vane airfoil.

3. The airfoil component of claim 1, wherein the first plurality of cooling holes have a first hole distribution density thereby providing the first cooling density and wherein the second plurality of cooling holes have a second hole distribution density thereby providing the second cooling density, wherein the first hole distribution density is different from the second hole distribution density.

4. The airfoil component of claim 1, wherein the first plurality of cooling holes that have a first cumulative cross-sectional area thereby providing the first cooling density and wherein the second plurality of cooling holes have a second cumulative cross-sectional area thereby providing the second cooling density, wherein the first cumulative cross-sectional area is different from the second cumulative cross-sectional area.

5. The airfoil component of claim 1, further comprising at least one rib extending in a radial direction on the insert.

6. The airfoil component of claim 1, further comprising a transition zone between the first and second zones of the insert, wherein the transition zone includes a change in cooling density from the first cooling density to the second cooling density in a radial direction.

7. The airfoil component of claim 1, wherein the vane airfoil includes a third zone, the third zone defined in a third radial extent of the vane airfoil, wherein the insert includes a third zone defined in a third radial extent that is aligned with the third zone of the vane airfoil, wherein the third zone of the insert includes a third plurality of cooling holes that provide a third cooling density, third cooling density being different from at least one of the first and second cooling densities.

8. The airfoil component of claim 7, wherein the third zone is radially inward from the first zone along the radial extent.

9. The airfoil component of claim 1, wherein the vane airfoil includes a third zone, the third zone defined in a third radial extent of the vane airfoil, wherein the insert includes a third zone defined in a third radial extent that is aligned with the third zone of the vane airfoil, wherein the third zone of the insert has a third cooling density that is zero.

10. A vane airfoil comprising:
an airfoil section including an outer wall that defines an internal cavity, the airfoil section having an axial extent defined between a leading end and a trailing end; and
an insert having an axial extent defined between a first end corresponding to the leading end of the airfoil section and a second end corresponding to the trailing end of the airfoil section, the insert situated in the internal cavity, the insert including a first zone defined across the axial extent from the first end to the second end of the insert, and defined in a radial extent of the insert, the first zone including a first plurality of cooling holes, and a second zone defined across the axial extent from the first end to the second end of the insert, and defined in a radial extent of the insert, the second zone including a second plurality of cooling holes, wherein the first plurality of cooling holes provide a first cooling density across the axial extent of the insert and the second plurality of cooling holes provide a second cooling density across the axial extent of the insert, wherein the first cooling density is higher than the second cooling density and the first plurality of cooling holes and the second plurality of cooling holes are configured to jet air towards the airfoil outer wall, and wherein the first zone is radially inward from the second zone along the radial extent.

11. The vane airfoil of claim 10, further comprising a transition zone between the first and second zones, wherein the transition zone includes a change in cooling density from the first density to the second density in a radial direction.

12. The vane airfoil of claim 10, further comprising a third zone defined in a radial extent of the insert, the third zone including a plurality of cooling holes, wherein the plurality of cooling holes in the third zone have a third density, the third density being different from at least one of the first and second densities.

13. The vane airfoil of claim 10, wherein the insert is a spar, and the spar is configured to provide structural support to the airfoil section.

14. The vane airfoil of claim 10, wherein the airfoil section is a ceramic matrix composite.

15. A method of assembling a ceramic matrix composite vane airfoil comprising:
providing an insert, the insert including:
a first zone defined across an axial extent between first and second axial ends of the insert, the first and second axial ends corresponding to leading and trailing ends of an airfoil component, respectively, and defined in a first radial extent with respect to the airfoil component and corresponding to a first expected temperature of the airfoil component
a second zone defined in across an axial extent between first and second axial ends of the insert, and defined in a second radial extent with respect to the airfoil component and corresponding to a second expected temperature of the airfoil component
wherein the first zone has a first plurality of cooling holes that provide a first cooling density across the axial extent of the insert corresponding to the first expected temperature and the second zone has a second plurality of cooling holes that provide a second cooling density across the axial extent of the insert corresponding to the second expected temperature, wherein the first expected temperature is higher than the second expected temperature, wherein the first cooling density is higher than the second cooling density, and wherein the first zone is radially inward from the second zone along the radial extent; and
inserting the insert into the airfoil component.

16. The method of claim 15, wherein at least some of the first and second pluralities of cooling holes are configured to jet air towards the airfoil component in a direction normal to a wall of the airfoil component.

17. The method of claim 15, wherein the first plurality of cooling holes are spaced apart from one another by a first distance thereby providing the first cooling density and wherein the second plurality of cooling holes that are spaced apart from one another by a second distance thereby providing the second cooling density, wherein the first distance is different from the second distance.

18. The method of claim 15, wherein the first plurality of cooling holes that have a first cumulative cross-sectional area thereby providing the first cooling density and wherein the second plurality of cooling holes that have a second cumulative cross-sectional area thereby providing the second cooling density, wherein the first cumulative cross-sectional area is different from the second cumulative cross-sectional area.

19. The method of claim 15, wherein the insert is a spar, and the spar is configured to provide structural support to the airfoil section.

20. The method of claim 15, further comprising a third zone defined in a third radial extent with respect to the airfoil component and corresponding to a third expected temperature of the airfoil component the third zone including a third plurality of cooling holes that provide a third cooling density, the third cooling density being different from at least one of the first and second cooling densities.

21. The method of claim 15, wherein the insert further comprises at least one rib extending in a radial direction on the insert.

22. The airfoil component of claim 8, wherein the third cooling density is less than the first cooling density.

23. The airfoil component of claim 22, wherein the third cooling density is between the first cooling density and the second cooling density.

24. The airfoil component of claim 22, wherein the third cooling density is less than the first cooling density and the second cooling density.

* * * * *